June 23, 1970  V. A. LIOBIS ET AL  3,516,170

FREEZE DRYING APPARATUS

Filed April 29, 1968  3 Sheets-Sheet 1

INVENTORS

VYTAUTAS A. LIOBIS, DECEASED,
BY ALDONA LIOBIS, LEGAL REPRESENTATIVE
DAVID FREEDMAN

BY

Blum, Moscovitz, Friedman, Blum, & Kaplan
ATTORNEYS

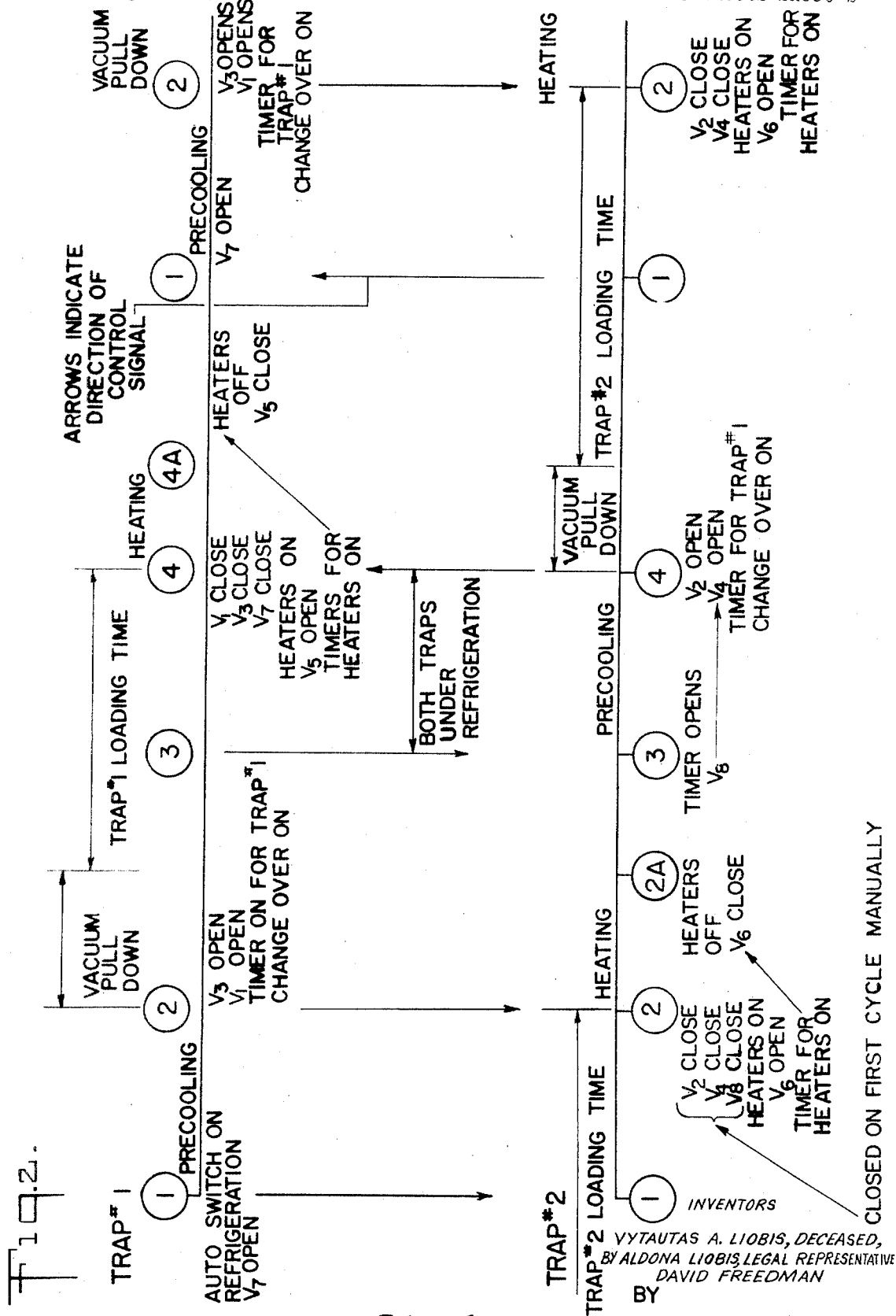

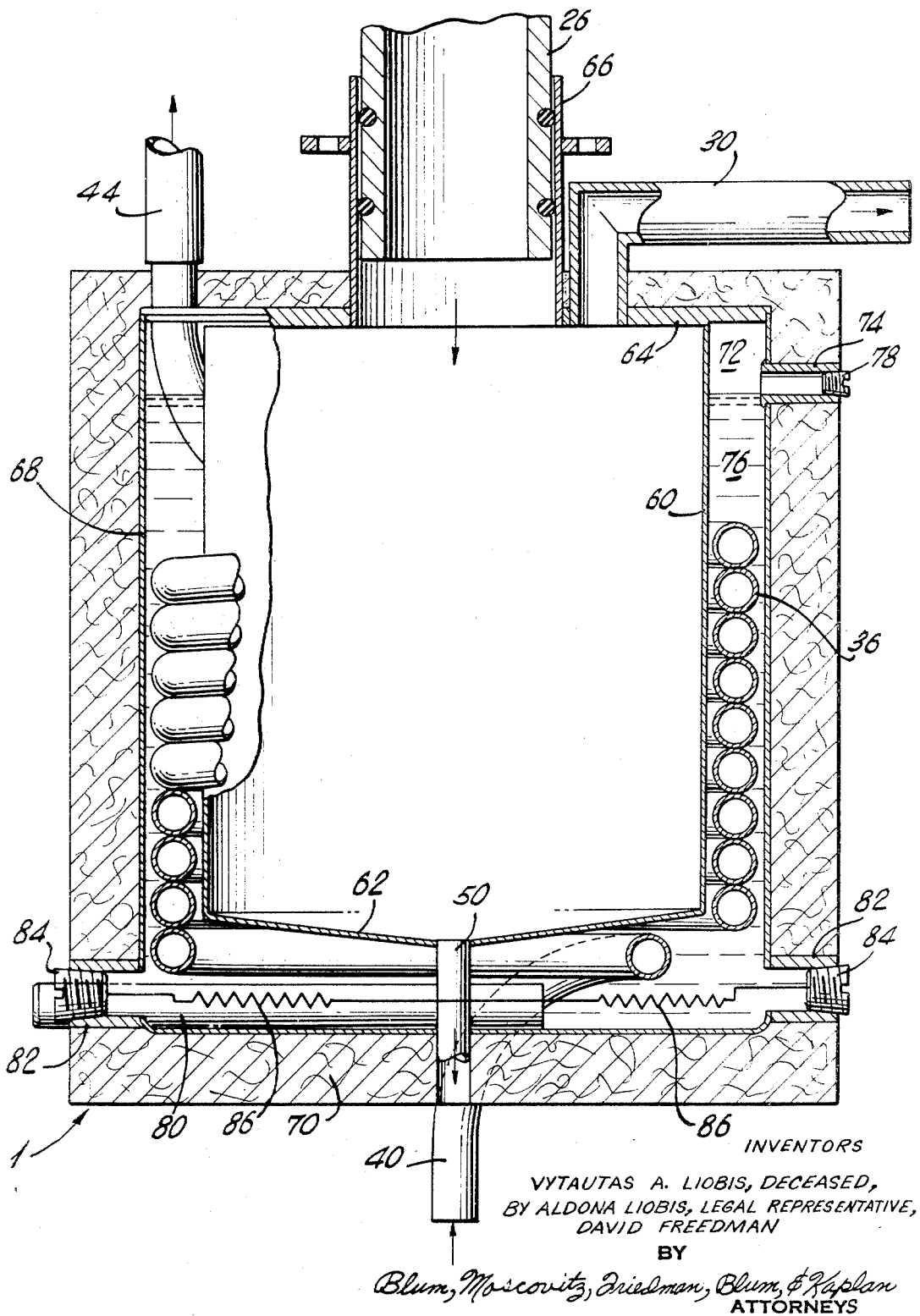

United States Patent Office 3,516,170
Patented June 23, 1970

3,516,170
FREEZE DRYING APPARATUS
Vytautas A. Liobis, deceased, late of Green Brook, N.J., by Aldona Liobis, legal representative, and David Freedman, Highland Park, N.J., assignors to New Brunswick Scientific Corporation, a corporation of New Jersey
Filed Apr. 29, 1968, Ser. No. 725,237
Int. Cl. F27b 19/00
U.S. Cl. 34—53                                    11 Claims

ABSTRACT OF THE DISCLOSURE

A freeze drying apparatus capable of automatic and continuous operation. The apparatus includes a pair of traps capable of being placed alternately in communication with a vacuum manifold, and each of these traps is capable of coacting with a refrigerating means and with a vacuum-creating means. An automatic control means is provided for operating the apparatus with one of the traps while the other of the traps is cut off from communication with the manifold means and for then operating the apparatus with this other trap while the first trap is cut off from communication with the manifold means, so that with the automatic controls of the invention it is possible to achieve continuous operation in a fully automatic manner.

BACKGROUND OF THE INVENTION

This invention relates to freeze drying apparatus.

As is well known, in an apparatus of this type it is necessary to provide for flow of a fluid along a path which is under vacuum while also condensing moisture out of the fluid. For this purpose it is conventional to provide a suitable trap within which the condensed moisture accumulates with the interior of the trap being under vacuum, and because the condensed moisture forms in the trap frost which continuously builds, the efficiency of the apparatus diminishes to a point where it is necessary to stop the operations with a given trap after frost has accumulated therein to a given extent, so that this latter trap can be defrosted. During the time when defrosting takes place the trap cannot continue the freeze-drying functions, and it has already been proposed to carry on the operation with another trap during defrosting of a previously used trap.

Conventional apparatus of this type, however, presents the great inconvenience of requiring manual termination of the operations with one trap and starting of the operations with another trap, so that not only is it possible for the freeze drying operations to be interrupted during change-over from one trap to another, but in addition there is a considerable labor cost involved in these manual operations.

Furthermore, the conventional apparatus is incapable of achieving uniform cooling throughout a given trap so as to provide a highly efficient condensation of moisture. Instead, it is unavoidable with conventional structures that there will be localized cooling at some areas greater than at other areas. Also, with conventional apparatus it is impossible to avoid undesirable temperature fluctuations in the trap due to sudden load increases of short duration when a new sample or batch of material which is to be treated is connected into the system.

SUMMARY OF THE INVENTION

It is, therefore, a primary object of the present invention to provide a freeze drying apparatus which will avoid the above drawbacks.

In particular, it is an object of the present invention to provide a freeze drying apparatus with an automatic control system enabling all of the functions to be automatically carried out in a fully automatic and fully continuous manner.

It is also an object of the present invention to provide an automatic control system not only capable of automatically defrosting one trap while another operates but also capable of bringing about such functions as pre-cooling of one trap prior to the time that it actually enters into the freeze-drying operation so that a high degree of efficiency can be achieved with the apparatus of the invention.

In addition, it is an object of the present invention to provide a structure where the trap will not have the disadvantages of uneven cooling and undesirable temperature fluctuations so that even when new material is connected into the apparatus to be treated thereby there will be no undesirable temperature fluctuation while at the same time localized cold spots will be reliably avoided.

At the same time, it is an object of the invention to provide a construction of this type which will produce an exceedingly efficient heat transfer so as to reduce even further the losses which are encountered with conventional apparatus.

In accordance with the invention the freeze drying apparatus includes a vacuum manifold means and at least two condensing trap means adapted to be placed alternately in communication with the manifold means. A refrigerating means and a vacuum-creating means both coact with each of the trap means. The automatic control means of the invention provides, during a first period of time, coaction between one of the trap means and the refrigerating means and vacuum-creating means while simultaneously, during this first period of time, providing communication between the manifold means and only this one trap means, with the other trap means cut off from communication with the manifold means during the first period of time. During a second period of time which is subsequent to the first period of time the automatic control means provides coaction between the other trap means and the refrigerating means and vacuum-creating means, and during this second period of time the automatic control means provides communication between the manifold means and only this other trap means while simultaneously preventing, during the second period of time, communication between the manifold means and the one trap means.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a diagrammatic representation of the functioning of the automatic control system of the invention; and FIG. 3 is a sectional elevation of the trap structure of the invention.

DESCRIPTION OF A PREFERRED EMBODIMENT

Figure 1:
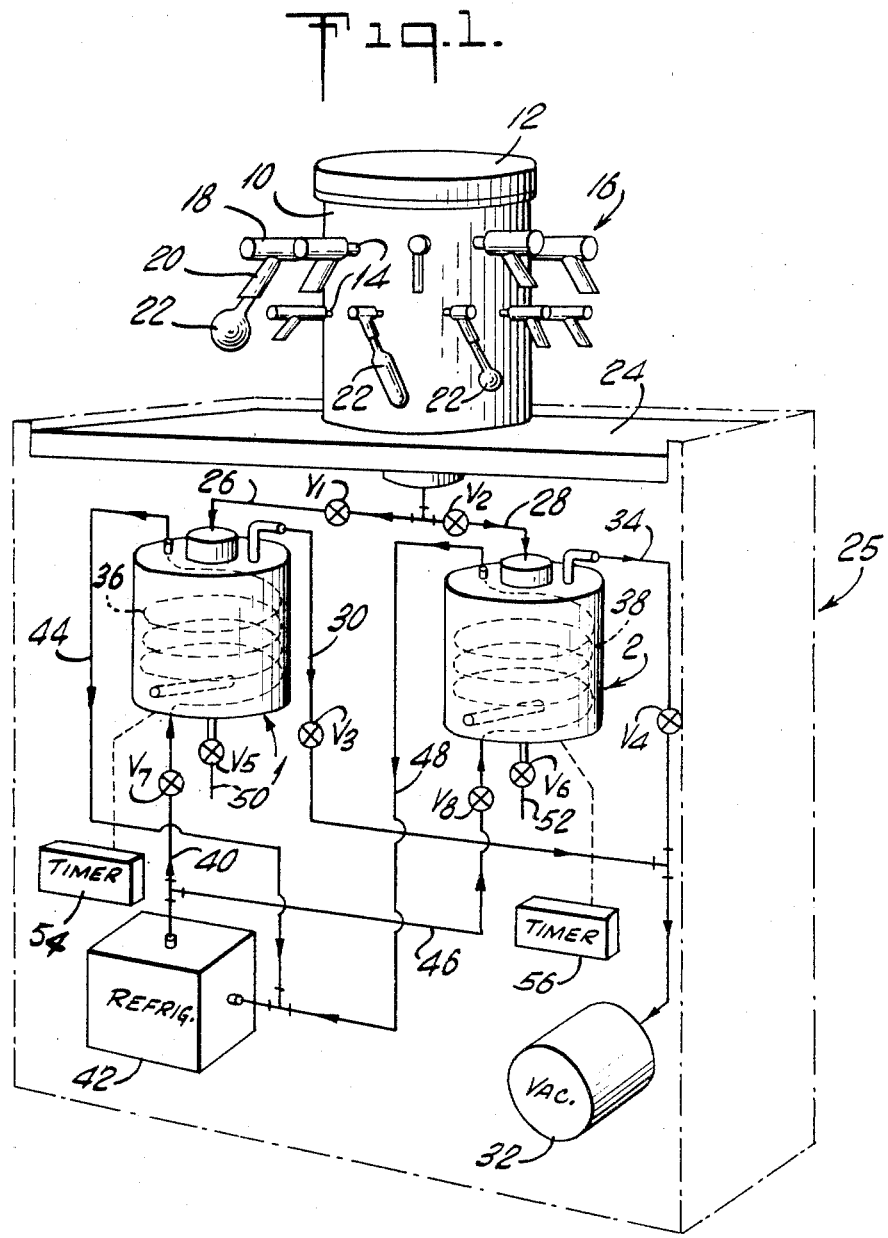
FIG. 1 is a schematic illustration of one possible embodiment of a freeze drying apparatus according to the invention.

Referring now to FIG. 1, there is shown at the upper part thereof a manifold drum 10 forming a manifold means. The drum 10 is in the form of a hollow cylinder closed at its top end in a fluid-tight manner by a cover 12, and the cylindrical wall of the drum 10 is provided with a plurality of short pipes 14 which communicate through the wall of the drum 10 with the interior thereof and which have outer open ends. On the outer open ends of the pipes 14, which form ports communicating with the interior of the drum, there are respectively mounted valve assemblies 16 each of which is in the form of an elongated sleeve 18 fluid-tightly mounted on and surrounding the outer open end portion of a pipe 14. The outer end of each sleeve 18 is closed, and between its ends, situated outwardly beyond the open end of the pipe 14 each sleeve 18 carries a flexible resilient flat tubular member 20 which normally has its opposed side walls pressed tightly against each other due to the outer atmospheric pressure, the interior of the drum 10 being under vacuum, so that in this way each valve assembly 16 is normally maintained closed. However, when a sample is to be freeze dried, this sample which is in a frozen state within a bottle or flask 22, is placed in communication with the interior of the tube 20 by placing the latter around the open outlet of the bottle 22 with this flexible tubular valve member 20 fluid-tightly surrounding the outlet neck of the flask or bottle 22 which contains the sample which is to be freeze dried. The friction between the neck of the bottle 22 and the flexible tubular valve 20 is sufficient to support the bottle 22 with the sample therein in a manner indicated in FIG. 1. In this way a number of samples may be connected to the apparatus of the invention in the manner indicated in FIG. 1.

The bottom wall of the manifold drum 10 rests on the top wall 24 of a cabinet 25 which contains the remainder of the apparatus of the invention and which may be provided with any suitable doors or the like through which access may be had to the interior of the cabinet 25. Also the cabinet 25 is provided at its upper front wall portion with a suitable control panel for supporting various controls by which the operations are regulated as well as for supporting gauges to indicate temperature, pressure, and the like.

The bottom wall of the manifold drum 10 has a central opening from which a manifold outlet tube extends downwardly through the top wall 24 into the interior of the cabinet 25. This manifold outlet branches into a pair of conduits 26 and 28 which are fluid-tightly connected with the manifold outlet as by a suitable T-connection. The conduit 26 is provided with a valve $V_1$ while the conduit 28 is provided with a valve $V_2$. The valves are operated in a manner described below for the purpose of opening and closing the conduits.

The conduit 26 communicates fluid-tightly with a trap 1 which forms a condensing trap means, while the conduit 28 fluid-tightly communicates with a trap 2 which forms also a condensing trap means.

The trap 1 communicates fluid-tightly through a conduit 30 with a vacuum pump 32 while the trap 2 communicates fluid-tightly through a conduit 34 with the same vacuum pump 32. The conduit 30 can be opened and closed by way of a valve $V_3$, while the conduit 34 can be opened and closed by way of a valve $V_4$.

As will be apparent from the description below in connection with FIG. 3, each trap has a refrigerating coil, and FIG. 1 schematically shows the refrigerating coil 36 of the trap 1 and the refrigerating coil 38 of the trap 2. The refrigerating coil 36 communicates through a conduit 40 with the outlet of a refrigerating means 42 so that a suitable refrigerant, such as freon, will flow through the conduit 40 into the coil 36. The coil 36 communicates with a return conduit 44 which serves to return the refrigerant back to the refrigerating means 42. The outlet of the refrigerating means 42 also communicates through a conduit 46 with the coil 38 of trap 2 for supplying the latter coil with the refrigerant, and the coil 38 communicates with a return conduit 48 through which the refrigerant is returned to the refrigerating means 42. The conduit 40 is provided with a valve $V_7$, while the conduit 46 is provided with a valve $V_8$, and these valves are operated for opening and closing the conduits 40 and 46.

Each trap is also provided with a valved drain outlet through which defrosted condensate can flow out of each trap. Thus, the trap 1 is provided with a drain outlet 50 provided with the valve $V_5$, while the trap 2 is provided with a drain outlet 52 provided with the valve $V_6$.

As is schematically indicated in FIG. 1, a pair of timer units 54 and 56 are respectively connected operatively with the traps 1 and 2 for controlling the opening and closing of the valves as well as for controlling the energizing and deenergizing of heating elements used for defrosting purposes. The timer units 54 and 56 as well as the several valves form the automatic control means of the invention. The valves may be motor-operated valves of the pinch type which act on flexible tubular portions of the several conduits where the valves are respectively located. Such motor-controlled pinch-type valves are well known. The timers will of course control the starting and stopping of the motors which open and close the valves.

FIG. 2 illustrates the automatic operation logic achieved with the structure of the invention. The upper horizontal line of FIG. 2 illustrates the operations taking place at trap 1 while the lower horizontal line illustrates the operations taking place at trap 2. FIG. 2 illustrates one complete cycle of operations and the initial part of a succeeding cycle of operations. Each cycle may be considered as starting at an instant of time 1. At this instant of each cycle the operations have already been under way with the trap 2, and the valve $V_2$ has previously been opened and remains open while the valve $V_1$ has previously been closed and remains closed, so that at the instant of time 1 indicated in FIG. 2 the operations have been and are continuing to proceed with the trap 2 which at this time has been and still is in communication with the manifold means 10, the automatic control means maintaining the trap means 1 simultaneously out of communication with the manifold means 10 by maintaining the valve $V_1$ closed. Also at this instant of time the valve $V_4$ has previously been opened and still is in and remains in its open position while the valve $V_5$ has previously been closed and remains in its closed position, so that it is only the trap 2 which is under vacuum and through the conduit 28 and the valve $V_2$ the interior of the manifold drum 10 is also under vacuum. Furthermore, at this time the valve $V_8$ has previously been opened and still is in its open position in which it remains so that the refrigerant is circulated through the coil 38. The valve $V_6$ has previously been closed and remains closed at this time, and the defrosting operations at the trap 1 have also been previously completed so that the valve $V_5$ is also closed and remains closed at this time.

At the instant 1 of each cycle the timer 54 of the automatic control means automatically opens the valve $V_7$, so that the refrigerant will now circulate through the coil 36, and thus precooling of the trap 1 commences. This is the only change in the operations which automatically takes place at the instant 1 of each cycle. The circulation of the refrigerant through the coil 38 continues and the operations continue to go forward at the trap 2 while the trap 1 is precooled in preparation for switching over of the operations from the trap 2 to the trap 1 so that the latter will be at the required refrigerated operating temperature when the operations are started with the trap 1.

Thus, at this time the freeze-drying operations continue with the trap 2 while the trap 1 is precooled in preparation for switching the operations from the trap 2 to the trap 1. This precooling of the trap 1 will continue until the instant 2 of each cycle, this instant 2 occurring at a given period of time after the instant 1, and this latter period of time is sufficiently great to enable the temperature of the trap 1 to be lowered to the required operating temperature. At the instant 2 of each cycle the actual change-over from trap 2 to trap 1 takes place. At this instant 2 of each cycle the valve $V_7$ remains open while the valve $V_5$ remains closed, and the timer 54 of the automatic control means of the invention opens the valves $V_1$ and $V_3$ so as to place the trap 1 in communication with the vacuum manifold means 10 and the vacuum pump 32. At the very same instant the timer 56 operates to close the valve $V_2$, the valve $V_4$, and the valve $V_8$, and to simultaneously open the valve $V_6$ while energizing a heating means referred to below so as to bring about defrosting of the trap 2. Thus, communication between the trap 2 and the vacuum manifold means 10 and vacuum pump 32 is cut off, and simultaneously communication of the trap 2 with the refrigerating means 42 is cut off while an electrical resistance heater which coacts with the trap 2 is energized for defrosting the latter, the drain valve $V_6$ being opened simultaneously with the closing of the valves $V_2$, $V_4$ and $V_8$.

Now the vacuum will act through the trap 1 and the pressure at the trap 2 rises to atmospheric pressure while the defrosted condensate drains out through the conduit 52 into any suitable receptacle. The energized heating elements which form the defrosting means of the trap 2 are maintained energized until the instant 2A indicated in FIG. 2, and the duration from the instant 2 up to the instant 2A is sufficiently great to guarantee that the trap 2 is completely defrosted with all of the moisture drained out of the latter. At the instant of time 2A the timer 56 automatically closes the valve $V_6$, and now the trap 2 is in readiness to be precooled for the next change-over in the operations.

The apparatus will remain in this position until the instant 3 of each cycle, and at this instant the timer 56 acts to open the valve $V_8$, so that precooling of the trap 2 commences. Thus, the instant 3 of each cycle provides for trap 2 the operations which occur for trap 1 at the instant 1.

The precooling of the trap 2 continues up to the instant 4 of each cycle, and at this latter instant the change-over takes place from the trap 1 to the trap 2. Thus, at this instant the valve $V_8$ remains open while the timer 54 automatically closes the valves $V_1$, $V_3$, and $V_7$ and opens the valve $V_5$ while simultaneously energizing the heating elements which form the defrosting means for the trap 1. At the same instant the timer 56 opens the valves $V_2$ and $V_4$, so that the trap 2 is again placed in communication with the vacuum manifold means 10 and the vacuum-creating means 32, and the communication of the trap 1 with the vacuum-creating means 32 and the vacuum manifold means 10 is again cut off at this time.

While the freeze drying operations now continue to go forward with the trap 2 the defrosting of the trap 1 continues until the instant 4A, and the duration of time between the instant 4 and the instant 4A is sufficiently great to guarantee that the trap 1 becomes completely defrosted, so that at the time 4A the timer 54 brings about deenergizing of the electric resistance heater elements which form the heating means for defrosting the trap 1. Now the trap 1 is in readiness to be precooled in preparation for the change-over, and the operations will now continue without any change until the instant 1 of the next cycle when all of the above operations are repeated.

Thus, with the automatic control means of the invention at each instant of change-over from one trap to the other, one of the traps has its communication with the vacuum-creating means and vacuum and manifold means cut off while the other trap is simultaneously placed in communication with the vacuum-creating means and the vacuum manifold means. For a given fraction of the period of time during which one of the traps communicates with the vacuum manifold means and vacuum-creating means the other trap is defrosted, and for a subsequent fraction of this same period of time the other trap is precooled up to the instant of the next change-over.

The details of each condensing trap means are indicated in FIG. 3. While FIG. 3 shows the details of the trap 1, it is to be understood that the trap 2 is identically constructed.

Referring now to FIG. 3, it will be seen that the trap means 1 illustrated therein includes an inner enclosure 60 made of a thin wall structure which may be metal, for example. This inner enclosure 60 has a slightly tapered bottom wall 62 communicating at its center with the outlet drain conduit 50. The inner enclosure 60 is fluid-tightly closed at its top end by a cover 64, and this cover is fluid-tightly connected with a tube 66 which communicates with the interior of the enclosure 60 and which is fluid-tightly connected with the conduit 26. The conduit 30 which leads to the vacuum-creating means 32 also communicates fluid-tightly with the interior of the enclosure 60 through the cover 64 thereof.

The trap means 1 further includes an outer receptacle 68 the interior of which receives the enclosure 60. This receptacle 68 is fluid-tightly closed by the other peripheral portion of the cover 64. The receptacle 68 is also surrounded by a suitable layer of insulation 70. The drain pipe 50 extends downwardly through the bottom wall of the receptacle 68.

The cylindrical side wall and bottom wall of the receptacle 68 are respectively spaced from the cylindrical side wall and bottom wall 62 of the enclosure 60, so that the receptacle 68 defines with the enclosure 60 a heat-exchanging chamber 72. The refrigerant conduit 36 is coiled within this chamber 72, and it is particularly to be noted that this coil 36 is spaced in its entirety from the enclosure 60 so that it has absolutely no direct contact with the enclosure 60, and in addition the coil 36 is entirely out of contact with the receptacle 68 except at the location where the conduit 40 passes through the bottom wall of the receptacle 68. The conduit 44 is connected with a portion of the coil 36 which extends up through the cover 64.

A filling tube 74 is carried by the receptacle 68 for filling the chamber 72 with a suitable heat-exchanging medium which in the illustrated example is a liquid 76 such as ethylene glycol. The inlet 74 can be closed by a plug 78 after the chamber 72 is filled with the heat-exchanging medium 76. Thus, refrigeration of the enclosure 60 will not take place by direct contact with the coil 36 but will instead take place through heat transfer through the liquid 76 in which the coil 36 is completely submerged.

A combined temperature-sensing and thermostat unit 80 extends fluid-tightly through the wall of the receptacle 68 into the interior of the chamber 72 beneath the inner enclosure 60. Through this unit 80 the temperature can be indicated at a suitable gauge at the control panel and at the same time the thermostat 80 will coact with the refrigerating means 42 for automatically turning the latter on and off to maintain the preselected temperature in the heat-exchanging medium 76.

The chamber 72 can be drained through a pair of outlets 82 respectively provided with plugs 84. Electrical resistance heating elements 86, which are suitably insulated, are connected into a suitable electrical circuit through insulating connections passing through the plugs 84, and these heaters 86 form the heating or defrosting means which will bring about defrosting of the trap when the elements 86 are energized by actuation of one or the other of the timers of the automatic control means. Thus, the defrosting also takes place by transfer of heat through the heat-exchanging medium 76.

The particular construction of the invention which is illustrated in FIG. 3 presents several advantages. The heat-exchanging medium 76 acts as a "cooling sink" or as a reserve cooling reservoir compensating for sudden, short duration increases in load, as is the case when each new sample is connected into the system. Thus, the heat-exchanging medium 76 prevents fluctuations of the trap temperature.

In addition, the illustrated structure described above provides for a great uniformity in the trap surface temperature without any localized cold spots as would be the case where the refrigerating coil is soldered or otherwise connected directly in contact with the trap vessel.

Thus, in addition to the advantages achieved from the fully continuous and fully automatic operation there are various advantages from the particular details of the trap structure. It is to be understood that the various increments of time indicated in FIG. 2 are not drawn to scale, but are only illustrated for the sake of clearly showing the various operations which take place. One complete freeze drying cycle is of relatively long duration, lasting, for example, for 60 hours, whereas a defrosting opeartion is of relatively short duration and may require a time interval of only 1½ hours, for example. Thus, the defrosting and precooling durations are very small fractions of the duration of the period of time during which condensation takes place in one or the other of the traps. As is indicated at the lower left of FIG. 2, when the operation of the entire apparatus is first started some of the operations can be carried out manually, but once the operations are under way the automatic control means brings about a completely automatic and continuous operation so that all that an attendant need do is to connect samples to and remove samples from the drum 10.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a freeze drying apparatus, vacuum manifold means, at least two condensing trap means communicating with said manifold means and each forming a condensing and vacuum chamber, refrigerating means coacting with both of said trap means for refrigerating the latter to condense moisture from the interior thereof, vacuum-creating means coacting with both of said trap means for reducing the pressure therein as well as for reducing the pressure in said manifold means through the communication of the latter with said trap means, and automatic control means coacting with said refrigerating means, vacuum-creating means, and manifold means, for providing, during a first period of time, coaction of one of said trap means with said refrigerating means and vacuum creating means and for simultaneously providing, during said first period of time, communication between said manifold means and only said one trap means while cutting off communication between said manifold means and said other trap means, for providing, during a second period of time subsequent to said first period of time, a coaction between said other trap means and said refrigerating and vacuum means and for simultaneously providing, during said second period of time, communication between said manifold means and only said other trap means while cutting off, during said second period of time, communication between said manifold means and said one trap means, for then repeating, during a third period of time subsequent to said second period of time, the operations which take place during said first period of time, and so on, so that fluid drawn through said manifold means will be alternately directed to said trap means sequentially during the successive periods of time, respectively.

2. The combination of claim 1 and wherein a pair of defrosting means respectively coact with said trap means for defrosting the latter, said automatic control means being operatively connected with said pair of defrosting means for rendering that defrosting means which coacts with said one trap means operative during those periods of time when said other trap means is placed in communication with said manifold means by said automatic control means and for rendering that defrosting means which coacts with said other trap means operative during those periods of time when said one trap means is placed in communication with said manifold means by said control means.

3. The combination of claim 1 and wherein said automatic control means provides coaction between said refrigerating means and said other trap means during a fraction of said first period of time extending up to expiration of the latter for precooling said other trap means, and said automatic control means providing coaction between said refrigerating means and said one trap means during a fraction of said second period of time extending up to expiration of the latter for precooling said one trap means, and so on.

4. The combination of claim 3 and wherein a pair of heating means respectively coact with said trap means for heating and defrosting the latter, said automatic control means rendering that heating means which coacts with said other trap means operative during a fraction of said first period of time earlier than said fraction thereof during which precooling of said other trap means takes place, and said automatic control means rendering said heating means which coacts with said one trap means operative during a fraction of said second period of time earlier than the fraction thereof during which precooling of said one trap means takes place and so on, so that while each trap means is cut off from communication with said manifold means it is first defrosted and thereafter precooled.

5. The combination of claim 1 and wherein a plurality of conduits provide communication between each trap means with said manifold means, said refrigerating means, and said vacuum-creating means, and said automatic control means including a plurality of valves carried by said conduits for respectively opening and closing the latter and timers coacting with said valves for controlling the opening and closing thereof and for determining the duration of said periods of time.

6. The combination of claim 5 and wherein both of said trap means are of an identical construction and the durations of said periods of time are equal.

7. The combination of claim 1 and wherein each trap means includes an inner enclosure, an outer receptacle within which said inner enclosure is located, said outer receptacle being spaced from said inner enclosure for defining therewith a heat-exchanging chamber situated between said inner enclosure and outer receptacle, said refrigerating means including a refrigerant conduit within which a refrigerating medium flows, said conduit being located within said heat-exchanging chamber spaced from said inner enclosure so as to be out of direct contact therewith, and a heat-exchanging medium situated in said heat exchanging chamber for providing heat transfer between said inner enclosure and said refrigerant conduit without direct engagement therebetween.

8. The combination of claim 7 and wherein said heat-exchanging medium is a liquid.

9. The combination of claim 8 and wherein said inner enclosure includes a cylindrical side wall and said receptacle includes a cylindrical side wall surrounding and spaced from said side wall of said enclosure to define at least part of said heat-exchanging chamber therewith, said refrigerant conduit being in the form of a coil surrounding and spaced from said side wall of said inner enclosure and completely submerged within said liquid heat-exchanging medium.

10. The combination of claim 9 and wherein said side wall of said receptacle surrounds and is spaced from said coil, so that said coil is completely surrounded by said heat-exchanging medium at least at the region of said coil which is situated between said cylindrical side walls.

11. The combination of claim 10 and wherein a pair of heating means are respectively situated in said heat-exchanging chambers of said trap means for heating the liquid heat-exchanging medium therein for defrosting said inner enclosures, said automatic control means co-acting with said pair of heating means for rendering that heating means which is in the heat-exchanging chamber of said other trap means operative during a fraction of said first period of time to defrost said other trap means before said second period of time and said automatic control means rendering said heating means in said heat-exchanging chamber of said one trap means operative during said second period of time for defrosting said one trap means prior to said third period of time, and so on.

References Cited
UNITED STATES PATENTS

| | | | |
|---|---|---|---|
| 2,163,996 | 6/1939 | Flosdorf | 34—5 X |
| 3,146,077 | 8/1964 | Fuentevilla | 34—92 |
| 3,435,247 | 3/1969 | Pfeiffer | 34—53 X |

JOHN J. CAMBY, Primary Examiner

U.S. Cl. X.R.

34—5, 92